United States Patent
Laws et al.

(10) Patent No.: US 7,106,323 B2
(45) Date of Patent: Sep. 12, 2006

(54) RASTERIZER EDGE FUNCTION OPTIMIZATIONS

(75) Inventors: Philip R. Laws, Staines (GB); Jon Worthington, Bournemouth (GB)

(73) Assignee: 3DLabs, LTD, Surrey (GB)

( * ) Notice: Subject to any disclaimer, the term of this patent is extended or adjusted under 35 U.S.C. 154(b) by 103 days.

(21) Appl. No.: 10/071,895

(22) Filed: Feb. 8, 2002

(65) Prior Publication Data
US 2003/0128204 A1    Jul. 10, 2003

Related U.S. Application Data

(60) Provisional application No. 60/267,265, filed on Feb. 8, 2001.

(51) Int. Cl.
*G06T 15/00* (2006.01)
(52) U.S. Cl. .................................... 345/420
(58) Field of Classification Search ................ 345/419, 345/420, 426, 582, 587
See application file for complete search history.

(56) References Cited
U.S. PATENT DOCUMENTS
6,344,852 B1    2/2002    Zhu

OTHER PUBLICATIONS

Watt et al., " Advanced Animation and Rendering Techniques" 1992, ACM Press, pp. 22-27.*
Pineda, A Parallel Algorithm for Polygon Rasterization, ACM, Computer Graphics, vol. 22, No. 4, Aug. 1988, pp. 17-20.*
Apgar et al., A Display System for the Stellar Graphics Supercomputer Model GS1000, ACM, Computer Graphics, vol. 22, No. 4, Aug. 1988, pp. 255-262.*

* cited by examiner

*Primary Examiner*—Almis R. Jankus
(74) *Attorney, Agent, or Firm*—Groover & Holmes

(57) ABSTRACT

A set of techniques for rapidly computing a half-plane membership test for successive patches of pixels. By using an inheritance relation to carry forward values already computed at patch boundaries, the computational load for each successive patch is minimized. In a sample embodiment, just one interior point and one new boundary point are computed for each new patch of 64 pixels. Each of the 64 pixels can be described by an offset from one of the 5 reference points (i.e. the one interior point, the one newly computed boundary point, and 3 previously computed boundary points). By exploiting shift and complement relations, only a small number of offsets need to be independently computed (only 10 in this example). Since membership is determined merely by the sign of the relevant half-plane functions being computed, a simple compare between the half-plane function at the reference point and the half-plane function for the relevant offset suffices to evaluate the function's sign for that particular pixel.

17 Claims, 5 Drawing Sheets

| TL | +1dx | +2dx | +3dx | +4dy | -3dx | -2dx | -1dx | TR |
|---|---|---|---|---|---|---|---|---|
| +1dy | +1dx+1dy | +2dx+1dy | +3dx+1dy | -3dy | -3dx+1dy | -2dx+1dy | -1dx+1dy | |
| +2dy | +1dx+2dy | +2dx+2dy | -1dx-2dy | -2dy | +1dx-2dy | -2dx+2dy | -1dx+2dy | |
| +3dy | -3dx-1dy | -2dx-1dy | -1dx-1dy | -1dy | +1dx-1dy | +2dx-1dy | +3dx-1dy | |
| -4dy | -3dx | -2dx | -1dx | MP | +1dx | +2dx | +3dx | |
| -3dy | -3dx+1dy | -2dx+1dy | -1dx+1dy | +1dy | +1dx+1dy | +2dx+1dy | +3dx+1dy | |
| -2dy | +1dx-2dy | -2dx-2dy | -1dx-2dy | +2dy | +1dx+2dy | +2dx+2dy | -1dx-2dy | |
| -1dy | +1dx-1dy | +2dx-1dy | +3dx-1dy | +3dy | -3dx-1dy | -2dx-1dy | -1dx-1dy | |
| BL | | | | | | | | BR |

FIG. 1A

| TL | +1dx | +2dx | +3dx | +4dy | -3dx | -2dx | -1dx | TR |
|---|---|---|---|---|---|---|---|---|
| +1dy | +1dx+1dy | +2dx+1dy | +3dx+1dy | -3dy | -3dx+1dy | -2dx+1dy | -1dx+1dy | |
| +2dy | +1dx+2dy | +2dx+2dy | -1dx-2dy | -2dy | +1dx-2dy | -2dx+2dy | -1dx+2dy | |
| +3dy | -3dx-1dy | -2dx-1dy | -1dx-1dy | -1dy | +1dx-1dy | +2dx-1dy | +3dx+1dy | |
| -4dy | -3dx | -2dx | -1dx | MP | +1dx | +2dx | +3dx | |
| -3dy | -3dx+1dy | -2dx+1dy | -1dx+1dy | +1dy | +1dx+1dy | +2dx+1dy | +3dx+1dy | |
| -2dy | +1dx-2dy | -2dx-2dy | -1dx-2dy | +2dy | +1dx+2dy | +2dx+2dy | -1dx-2dy | |
| -1dy | +1dx-1dy | +2dx-1dy | +3dx-1dy | +3dy | -3dx-1dy | -2dx-1dy | -1dx-1dy | |
| BL | | | | | | | | BR |

| TL | +2dx | +3dx | +4dy | -3dx | -2dx | -1dx | TR |
|---|---|---|---|---|---|---|---|
| +1dy | +1dx | +2dx+dy | +3dx+1dy | -3dy | -3dx+1dy | -2dx+1dy | -1dx+1dy | |
| +2dy | +1dx+1dy | +2dx+2dy | -1dx-2dy | -2dy | +1dx-2dy | -2dx+2dy | -1dx+2dy | |
| +3dy | +1dx+2dy | -2dx-1dy | -1dx-1dy | -1dy | +1dx-1dy | +2dx-1dy | +3dx-1dy | |
| -4dy | -3dx-1dy | -2dx-1dy | -1dx | MP | +1dx | +2dx | +3dx | |
| -3dy | -3dx | -2dx-1dy | -1dx+1dy | +1dy | +1dx+1dy | +2dx+1dy | +3dx+1dy | |
| -2dy | -3dx+1dy | -2dx-2dy | -1dx-2dy | +2dy | +1dx+2dy | +2dx+2dy | -1dx-1dy | |
| BL | +1dx-1dy | +2dx-1dy | +3dx-1dy | -3dy | -2dx-1dy | -2dx-1dy | -1dx-1dy | BR |

FIG. 1B

RASTERIZER EDGE FUNCTION OPTIMIZATIONS

CROSS-REFERENCE TO OTHER APPLICATION

This application claims priority from 60/267,265 filed Feb. 8, 2001, which is hereby incorporated by reference.

BACKGROUND AND SUMMARY OF THE INVENTION

The present invention relates to 3D graphics processing, and particularly to rasterization.

BACKGROUND

3D Computer Graphics

One of the driving features in the performance of most single-user computers is computer graphics. This is particularly important in computer games and workstations, but is generally very important across the personal computer market.

For some years the most critical area of graphics development has been in three-dimensional ("3D") graphics. The peculiar demands of 3D graphics are driven by the need to present a realistic view, on a computer monitor, of a three-dimensional scene. The pattern written onto the two-dimensional screen must therefore be derived from the three-dimensional geometries in such a way that the user can easily "see" the three-dimensional scene (as if the screen were merely a window into a real three-dimensional scene). This requires extensive computation to obtain the correct image for display, taking account of surface textures, lighting, shadowing, and other characteristics.

The starting point (for the aspects of computer graphics considered in the present application) is a three-dimensional scene, with specified viewpoint and lighting (etc.). The elements of a 3D scene are normally defined by sets of polygons (typically triangles), each having attributes such as color, reflectivity, and spatial location. (For example, a walking human, at a given instant, might be translated into a few hundred triangles which map out the surface of the human's body.) Textures are "applied" onto the polygons, to provide detail in the scene. (For example, a flat carpeted floor will look far more realistic if a simple repeating texture pattern is applied onto it.) Designers use specialized modelling software tools, such as 3D Studio, to build textured polygonal models.

The 3D graphics pipeline consists of two major stages, or subsystems, referred to as geometry and rendering. The geometry stage is responsible for managing all polygon activities and for converting three-dimensional spatial data into a two-dimensional representation of the viewed scene, with properly-transformed polygons. The polygons in the three-dimensional scene, with their applied textures, must then be transformed to obtain their correct appearance from the viewpoint of the moment; this transformation requires calculation of lighting (and apparent brightness), foreshortening, obstruction, etc.

However, even after these transformations and extensive calculations have been done, there is still a large amount of data manipulation to be done: the correct values for EACH PIXEL of the transformed polygons must be derived from the two-dimensional representation. (This requires not only interpolation of pixel values within a polygon, but also correct application of properly oriented texture maps.) The rendering stage is responsible for these activities: it "renders" the two-dimensional data from the geometry stage to produce correct values for all pixels of each frame of the image sequence.

The most challenging 3D graphics applications are dynamic rather than static. In addition to changing objects in the scene, many applications also seek to convey an illusion of movement by changing the scene in response to the user's input. Whenever a change in the orientation or position of the camera is desired, every object in a scene must be recalculated relative to the new view. As can be imagined, a fast-paced game needing to maintain a high frame rate will require many calculations and many memory accesses.

FIG. 2 shows a high-level overview of the processes performed in the overall 3D graphics pipeline. However, this is a very general overview, which ignores the crucial issues of what hardware performs which operations.

Texturing

There are different ways to add complexity to a 3D scene. Creating more and more detailed models, consisting of a greater number of polygons, is one way to add visual interest to a scene. However, adding polygons necessitates paying the price of having to manipulate more geometry. 3D systems have what is known as a "polygon budget," an approximate number of polygons that can be manipulated without unacceptable performance degradation. In general, fewer polygons yield higher frame rates.

The visual appeal of computer graphics rendering is greatly enhanced by the use of "textures." A texture is a two-dimensional image which is mapped into the data to be rendered. Textures provide a very efficient way to generate the level of minor surface detail which makes synthetic images realistic, without requiring transfer of immense amounts of data. Texture patterns provide realistic detail at the sub-polygon level, so the higher-level tasks of polygon-processing are not overloaded. See Foley et al., Computer Graphics: Principles and Practice (2.ed. 1990, corr. 1995), especially at pages 741–744; Paul S. Heckbert, "Fundamentals of Texture Mapping and Image Warping," Thesis submitted to Dept. of EE and Computer Science, University of California, Berkeley, Jun. 17, 1994; Heckbert, "Survey of Computer Graphics," IEEE Computer Graphics, November 1986, pp.56; all of which are hereby incorporated by reference. Game programmers have also found that texture mapping is generally a very efficient way to achieve very dynamic images without requiring a hugely increased memory bandwidth for data handling.

A typical graphics system reads data from a texture map, processes it, and writes color data to display memory. The processing may include mipmap filtering which requires access to several maps. The texture map need not be limited to colors, but can hold other information that can be applied to a surface to affect its appearance; this could include height perturbation to give the effect of roughness. The individual elements of a texture map are called "texels."

Awkward side-effects of texture mapping occur unless the renderer can apply texture maps with correct perspective. Perspective-corrected texture mapping involves an algorithm that translates "texels" (pixels from the bitmap texture image) into display pixels in accordance with the spatial orientation of the surface. Since the surfaces are transformed (by the host or geometry engine) to produce a 2D view, the textures will need to be similarly transformed by a linear transform (normally projective or "affine"). (In conventional terminology, the coordinates of the object surface, i.e. the primitive being rendered, are referred to as an (s,t) coordinate space, and the map of the stored texture is referred to a (u,v) coordinate space.) The transformation in the resulting mapping means that a horizontal line in the (x,y) display space is very likely to correspond to a slanted line in the (u,v) space of the texture map, and hence many additional reads will occur, due to the texturing operation, as rendering walks along a horizontal line of pixels.

One of the requirements of many 3-D graphics applications (especially gaming applications) is fill and texturing rates. Gaming and DCC (digital content creation) applications use complex textures, and may often use multiple textures with a single primitive. (CAD and similar workstation applications, by contrast, make much less use of textures, and typically use smaller polygons but more of them.) Achieving an adequately high rate of texturing and fill operations requires a very large memory bandwidth.

Rasterizer Edge Function Optimizations

The present application describes a set of techniques for rapidly computing a function (such as a half-plane membership test) for patches of pixels (more generally, for points on a grid). By using an inheritance relation to carry forward values already computed at patch boundaries, and by using symmetry relations to shift and/or complement offset value for pixels within a patch, the computational load for each successive patch is minimized. This is particularly advantageous for rapidly testing primitive membership of successive patches of pixels.

Thus the present application advantageously provides a hardware-efficient method of evaluating the solutions to a plane equation for points within a grid (e.g. pixels within a tile), by use of distance from calculated reference points.

The present application also advantageously provides a software architecture which is very suitable to parallelized computing.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 1A shows how computation of only one new boundary pixel and one interior pixel, in combination with pixel offset values, permits evaluation of boundary functions for all pixels in a patch.

FIG. 1B shows how a reduced set of offset values are combined with incremental reference points, in a sample embodiment, to permit rapid calculation of an edge function for all pixels in a patch.

DETAILED DESCRIPTION OF THE PREFERRED EMBODIMENTS

The numerous innovative teachings of the present application will be described with particular reference to the presently preferred embodiment (by way of example, and not of limitation).

High performance graphics devices need to work on multiple pixels in parallel. A fundamental requirement of this is to be able to test whether the set of candidate pixels are inside the primitive or not. The well-known method of doing this is to encode the primitive description as a collection of half plane functions. If testing a pixel's position against the set of half plane functions shows that it is on the 'inside' of all the half planes then the pixel is in the primitive. This test can be done incrementally or in parallel for an arbitrary set of pixels. However, the set of pixels chosen to apply this test to is typically not arbitrary, but is arranged in a grid—an 8×8 tile in our case. There are well-documented short cuts to evaluating the edge function by making use of coherence between adjacent pixels, but extending these over a large patch of pixels (e.g. an 8×8 tile) still gives a more expensive solution than is desired.

During the tile seeking stage (in the presently preferred embodiment), the edge function is evaluated fully at the top left of the candidate tile (pixel TL, in FIG. 1B), and (depending on the tile sequencing) will already have been evaluated at the top left corner of three adjacent tiles (to the right and down, in the orientation shown, at points TR, BL, and BR). An additional pixel position MP is also calculated in the middle of the candidate tile. Each pixel within the tile is then referenced against one of these 5 reference point values.

FIG. 1B also shows how each pixel's position can be stated as an offset from the nearest one of the five reference points. Thus it can be seen that only two reference points need to be newly calculated, along with the offset values, to be able to reach correct values for every pixel.

TL, TR, BL, BR are the previously calculated value at the top left of the candidate tile and the butting tiles. MP is the calculated value at the mid-point of these. The pixels are shaded according to their closest calculated reference point, and the value in the box is the difference between the calculated value and the value at the pixel.

Figure 2:
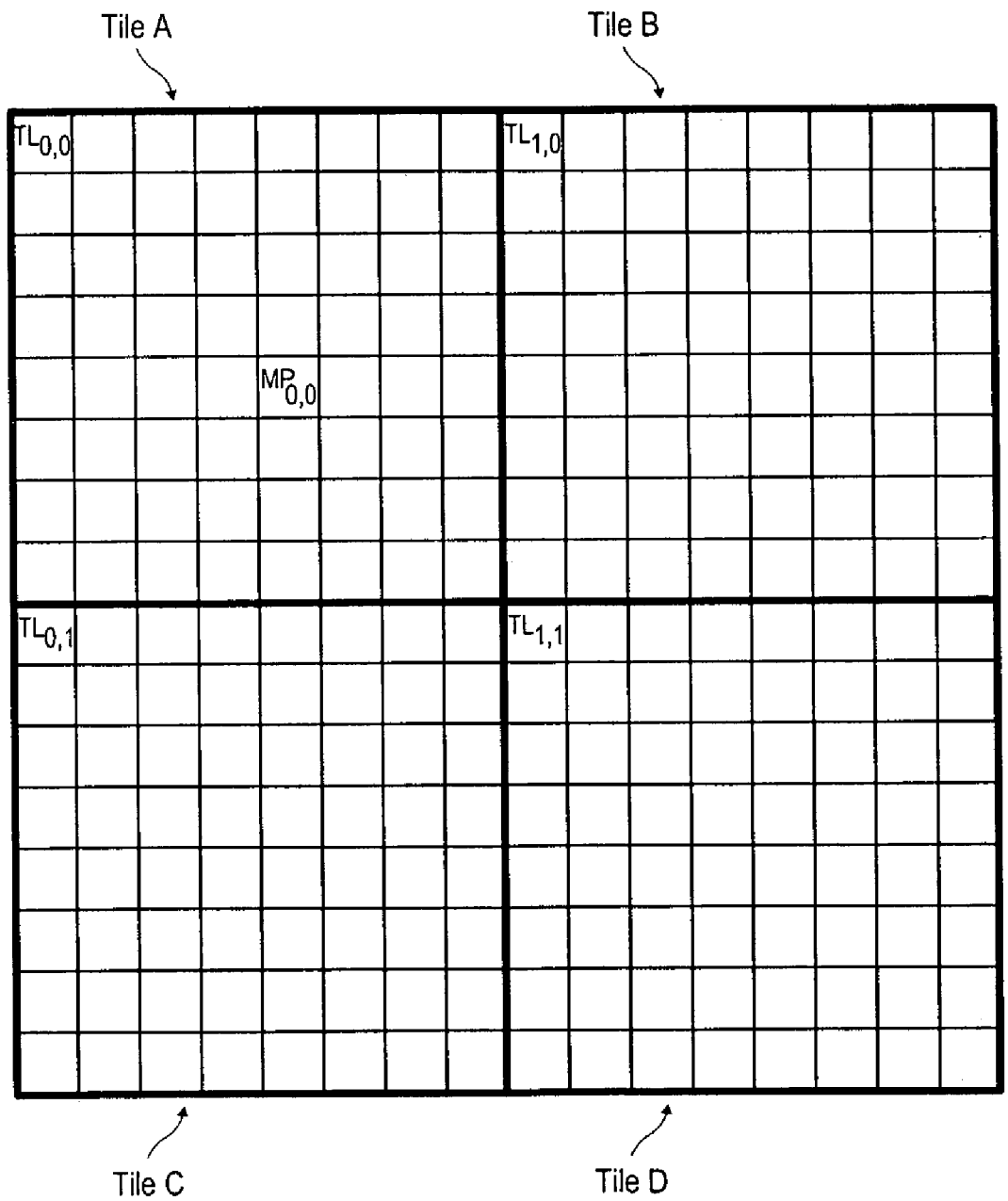
FIG. 2 shows how the single patch of FIG. 1A (or that of 1B) can use values computed for spatially adjacent patches.

FIG. 2 shows how the single patch of FIG. 1A (or that of 1B) can use values computed for spatially adjacent patches. In this illustration the tile shown in FIG. 1A is Tile A at the top left of FIG. 2, and:

pixel TR of FIG. 1A is pixel $TL_{1,0}$ of tile B;
pixel BL of FIG. 1A is pixel $TL_{0,1}$ of tile C; and
pixel BR of FIG. 1A is pixel $TL_{1,1}$ of tile D.

To calculate whether the pixel is inside or outside the edge, the offset for that pixel is added to the applicable reference point, and if the result is negative, then the pixel is outside, otherwise it is inside. Since the full numerical result is not important, it is not necessary to calculate these values, but instead a comparison can be done between the reference value and the offset to the given pixel.

As can be seen from FIG. 1B, the use of the middle point as a reference means that many of the offsets are not unique, and so each calculation can be re-used multiple times. Two further methods are used to reduce the number of calculations required.

FIG. 1A shows how a reduced set of offset values are combined with incremental reference points, in a sample embodiment, to permit rapid calculation of an edge function for all pixels in a patch.

Since all calculations are done using binary arithmetic, scaling by 2 or by 4 is done by shifting the number, so for example, the calculation of +2dx+2dy is not necessary, as this is simply the result of (+1dx+1dy) * 2.

Many of the remaining calculations required are simply the negative of another calculation (e.g. −1dx−1dy=−(+1dx+1dy)). As 2's complement arithmetic is being used, to calculate the negative of a number, the bits are inverted and 1 is added to this new number. However, as this number is then used in a comparison, instead of incrementing the number, the type of comparison done can be changed, to get the increment for free since the expressions (A<(B+1)) is equivalent to (A<=B).

By applying both of these methods for decimation, only the offset values shown in the dotted and shaded squares in FIG. 1A need to be calculated.

Overall Architectural Context

The innovations described above have been implemented in a graphics accelerator module which is different from conventional 3-D computer graphics architectures in several ways. While this preferred implementation context does not necessarily limit the claimed inventions, it does help to show the particular advantages of the inventions in this context.

This architecture described in the present application provides numerous features which satisfy both the demands of gaming-type and CAD-type applications. In addition to features which provide very high polygon rates (as in the GLINT™ architecture), many other features have been added which provide very high bandwidth for textures and similar applied data, as well as extremely high programmability.

Byte-Tiled Memory Organization

Bandwidth is an overriding concern in graphics accelerator design. The present application discloses an architecture in which memory bandwidth is optimized by a memory architecture where the memory is organized in tiles. Several important architectural features relate to the use of byte-deep tile-organized memory. One architectural choice is that the tile boundaries fall on fixed address boundaries in screen space (i.e. relative to the screen edge rather than to a window or to the primitive being rendered). The relation to screen space is surprisingly advantageous, since the relationship to screen space must eventually be obtained in any case.

Each tile of data, in this implementation, is only one byte deep. Thus, for example, with 32-bit color, one tile might consist of the red color data only for each of 64 pixels, and the next tile in memory would be the blue data only for the same 64 pixels. This implies that, while the tiles are constrained by fixed boundaries in the screen space, there is not any fixed mapping from screen location to physical or logical address in memory.

The use of tile organization for memory is implemented with a tile-seeking rasterization scheme. In order to identify the fragments within a primitive, without unnecessarily reading any tiles which will not be used in processing the primitive, the tile seeking processes reliably finds all tiles within which a given primitive wholly or partially falls.

Subtiles and supertiles can be used for some purposes. For example, parallelism among graphics processors is preferably implemented by allocation of supertiles. For another example, load-balancing among the parallel texture-processing pipelines is implemented by monitoring the number of active subtiles fetched for rendering.

Programmability

Programmability is an important requirement of current 3-D graphics accelerators. This is increasingly desired by game authors and other DCC (digital content creation) applications. Increased provision for programmability gives game and DCC authors the capability to create much more complex texturing and other effects. The disclosed architecture includes a very high degree of programmability at several stages of the graphics pipeline.

Plane-Equation Membership Testing

Primitive definitions are translated into plane equations, which require some changes in pixel membership tests. The cached memory architecture which was chosen to implement a tiled memory organization provides excellent scalability.

The use of plane equations for membership testing does not necessarily require full computation of the floating-point equation: membership is determined merely by sign and zero testing, so calculations can sometimes be truncated. A particularly advantageous implementation of this [TD-164] combines inheritance of membership with the process of finding which tiles are relevant to a particular primitive.

Scalability

Another aspect of scalability is parallelism: the 3D graphics accelerator disclosed herein can easily be paralleled to speed up graphics processing. Note that the use of multiple accelerators is particularly advantageous for applications, such as CAD, where throughput of small primitives is highly desirable.

Message-Passing Architecture with Data Bypass

A message-passing architecture is used for most control interactions, as in the GLINT™ architecture described e.g. in U.S. Pat. No. 5,594,854. As described in that patent, the message-passing architecture has important benefits for design, testing, and design modifications. However, the present architecture transmits pixel data through a different high-bandwidth bus path, which provides for much greater overall fill rate. The combination of message-passing control architecture with extremely high-bandwidth to memory provides a further improvement over the GLINT™ architecture.

Interrupt-Driven Capability

As 3D graphics accelerators have become more powerful, the rate and richness of their screen outputs has become fully comparable to video. An attractive line of development is to combine video functions with graphics capabilities. However, this requires an important capability which many graphics accelerators do not have, namely real-time synchronization to the frame rate of the video.

The disclosed architecture includes capability for interrupt-driven context-switching, which allows reliable synchronization to the real-time demands of a video interface.

Other Implementation choices

The transform and lighting stages are included in the graphics accelerator of the presently preferred implementation.

In the presently preferred embodiment the memory is entirely virtual.

In the presently preferred embodiment, the chip contains a scan chain to permit functional testing.

Graphics Accelerator Embodiment

Figure 3:
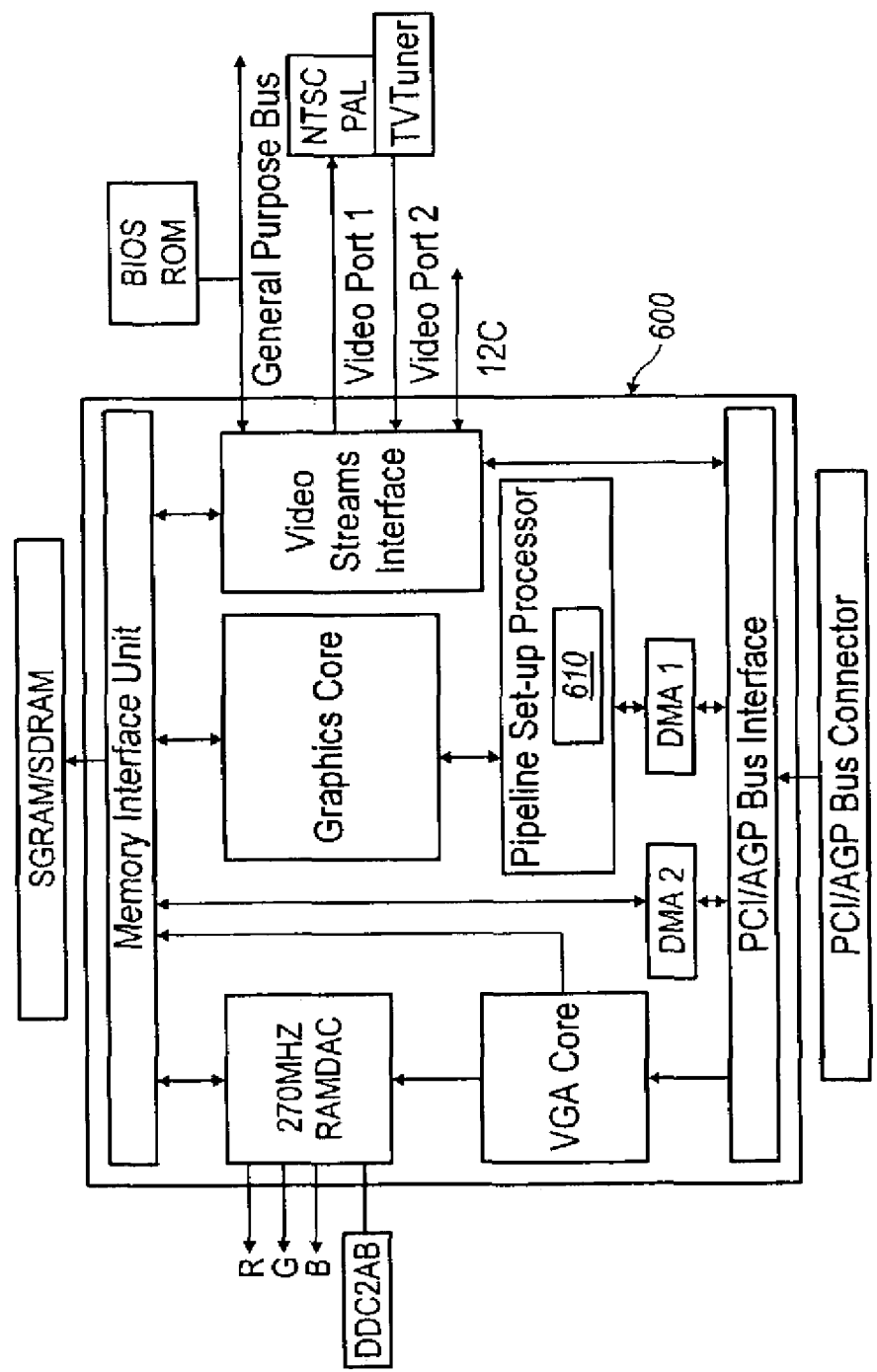
FIG. 3 shows a block diagram of a 3D graphics accelerator subsystem.

FIG. 3 shows a graphics processor 600 incorporating the disclosed texture filter. A PCI/AGP Interface accepts data from a PCI/AGP Bus Connector. Commands and data destined for Graphics Core pass in through DMA1, and graphics data bound for memory passes in through DMA2. Further details of the preferred pipeline architecture can be found in U.S. Pat. No. 5,798,770, which is hereby incorporated by reference.

Computer Embodiment

Figure 4:
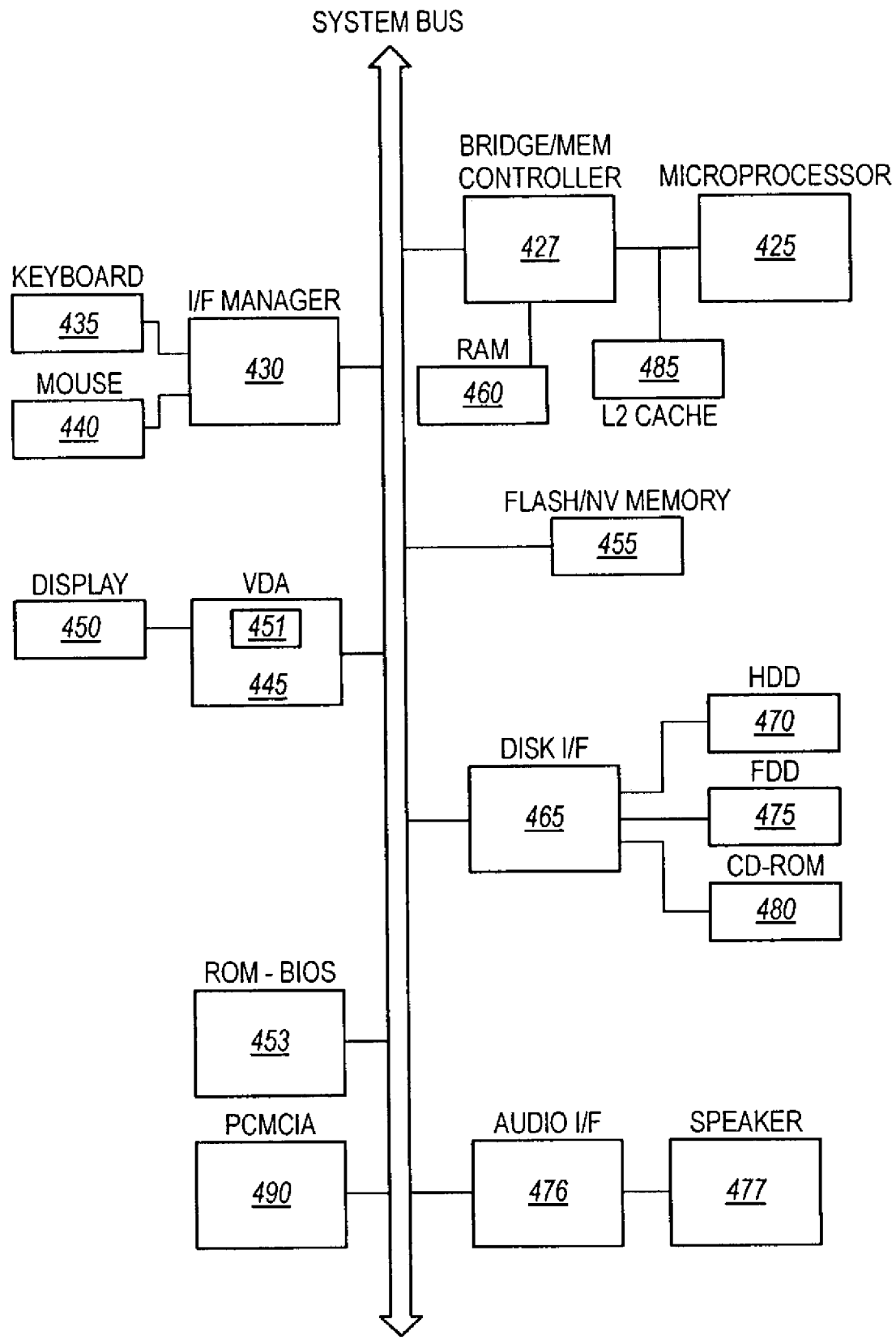
FIG. 4 is a block diagram of a computer which includes the 3D graphics accelerator subsystem of FIG. 3.

FIG. 4 shows a complete computer system, incorporating the graphics accelerator of FIG. 3, and including in this example: user input devices (e.g. keyboard 435 and mouse 440); at least one microprocessor 425 which is operatively connected to receive inputs from the input devices, across e.g. a system bus 431, through an interface manager chip 430 which provides an interface to the various ports and registers. The microprocessor interfaces to the system bus through e.g. a bridge controller 427. Memory (e.g. flash or non-volatile memory 455, RAM 460, and BIOS 453) is accessible by the microprocessor. a data output device (e.g. display 450 and video display adapter card 445, which includes a graphics accelerator subsystem 451) which is connected to output data generated by the microprocessor 425; and a mass storage disk drive 470 which is read-write accessible, through an interface unit 465, by the microprocessor 425. Optionally, of course, many other components can be included, and this configuration is not definitive by any means. For example, the computer may also include a CD-ROM drive 480 and floppy disk drive ("FDD") 475 which may interface to the disk interface controller 465. Additionally, L2 cache 485 may be added to speed data access from the disk drives to the microprocessor 425, and a PCMCIA 490 slot accommodates peripheral enhancements. The computer may also accommodate an audio system for multimedia capability comprising a sound card 476 and a speaker(s) 477.

According to a disclosed class of innovative embodiments, there is provided: A method for calculating edge functions for a patch of pixels, comprising the actions of: computing edge function values for at least one interior point within said patch; and computing edge function values for multiple other points within said patch, using an arithmetic combination of said edge function values for said interior point, together with previously computed values of said edge functions for points on the border of said patch, together with a reduced set of offset vectors.

According to another disclosed class of innovative embodiments, there is provided: A method for calculating edge functions for a patch of points, comprising the actions of: computing the value of an edge function at an interior reference point within said patch, and at a boundary reference point on the edge of said patch; and assessing the value of said edge function at multiple other points within said patch, by comparing the value of said edge function at a respective reference point, which may be said interior reference point or said boundary reference point or a previously computed reference point, with the delta value of said edge function for a respective one of a reduced set of offset vectors; wherein said reduced set of offset vectors does not include vectors which are complements or shifts of each other.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the disclosed innovations can also be adapted to larger patches of pixels; one example of this (though certainly not the only one) can be constructed by combining four of the patches illustrated to construct a 16×16 patch (256 pixels); in this case 5 interior points, one new corner point, and 2 new edge points would be computed for each patch.

For another example, the particular assignments of reference point and offset vector in the illustrated example are not necessarily unique, and other assignments can be made in accordance with the above teachings on using inheritance of computed reference point values and/or a reduced set of offsets.

For another example, the inheritance of corner reference points would of course be adjusted appropriately if the stepping direction during tile seek is different.

For fully parallelized computation, the core set of offset values can be calculated only once for any (linear) edge function. For each patch, the value of the function at the additional reference points in that patch needs to be calculated only once per patch, and each membership can then be computed in parallel for all pixels in the patch. However, of course other parallelization techniques can used if preferred.

Additional general background, which helps to show variations and implementations, may be found in the following publications, all of which are hereby incorporated by reference: Advances in Computer Graphics (ed. Enderle 1990); Angel, Interactive Computer Graphics: A Top-Down Approach with OpenGL; Angell, High-Resolution Computer Graphics Using C (1990); the several books of "Jim Blinn's Corner" columns; Computer Graphics Hardware (ed. Reghbati and Lee 1988); Computer Graphics: Image Synthesis (ed. Joy et al.); Eberly: 3D Game Engine Design (2000); Ebert: Texturing and Modelling 2.ed. (1998); Foley et al., Fundamentals of Interactive Computer Graphics (2.ed. 1984); Foley, Computer Graphics Principles & Practice (2.ed. 1990); Foley, Introduction to Computer Graphics (1994); Glidden: Graphics Programming With Direct3D (1997); Hearn and Baker, Computer Graphics (2.ed. 1994); Hill: Computer Graphics Using OpenGL; Latham, Dictionary of Computer Graphics (1991); Tomas Moeller and Eric Haines, Real-Time Rendering (1999); Michael O'Rourke, Principles of Three-Dimensional Computer Animation; Prosise, How Computer Graphics Work (1994); Rimmer, Bit Mapped Graphics (2.ed. 1993); Rogers et al., Mathematical Elements for Computer Graphics (2.ed. 1990); Rogers, Procedural Elements For Computer Graphics (1997); Salmon, Computer Graphics Systems & Concepts (1987); Schachter, Computer Image Generation (1990); Watt, Three-Dimensional Computer Graphics (2.ed. 1994, 3.ed. 2000); Watt and Watt, Advanced Animation and Rendering Techniques: Theory and Practice; Scott Whitman, Multiprocessor Methods For Computer Graphics Rendering; the SIGGRAPH Proceedings for the years 1980 to date; and the IEEE Computer Graphics and Applications magazine for the years 1990 to date. These publications (all of which are hereby incorporated by reference) also illustrate the knowledge of those skilled in the art regarding possible modifications and variations of the disclosed concepts and embodiments, and regarding the predictable results of such modifications.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A method of performing a half-plane membership test for a pixel, comprising the steps of:
    calculating an edge function for a first pixel of a patch, the first pixel having a first offset and being in the half-plane;
    calculating a second offset for a second pixel of the patch;
    comparing the first offset and the second offset to determine if the second pixel is in the half-plane.

2. The method of claim 1, wherein if the second offset is greater than the first offset, the second pixel is in the half-plane.

3. The method of claim 1, wherein the position of a third pixel of the patch is stated as an offset from a nearest one of a plurality of reference points.

4. The method of claim 3, wherein at least one of the plurality of reference points is in an adjacent patch.

5. The method of claim 3, wherein a first reference point of the plurality is the first pixel.

6. The method of claim 1, wherein the second offset is the negative of the first offset, and wherein the second offset is calculated using 2's complement arithmetic by inverting the bits of the first offset and adding one.

7. A method of performing a half-plane membership test for a pixel, comprising the steps of:
   calculating an edge function for a first pixel of a patch, the first pixel having a first offset and being in the half-plane;
   calculating a second offset for a second pixel of the patch;
   wherein the second offset is the negative of the first offset, and wherein the second offset is calculated using 2's complement arithmetic by inverting the bits of the first offset and adding one.

8. The method of claim 7, wherein if the second offset plus one is greater than the value of the first offset, the second pixel is in the half-plane.

9. The method of claim 7, wherein the position of a third pixel of the patch is stated as an offset from a nearest one of a plurality of reference points.

10. The method of claim 9, wherein at least one of the plurality of reference points is in an adjacent patch.

11. The method of claim 9, wherein a first reference point of the plurality is the first pixel.

12. The method of claim 7, wherein the second offset is the negative of the first offset, and wherein the second offset is calculated using 2's complement arithmetic by inverting the bits of the first offset and adding one.

13. A method of performing a half-plane membership test for a pixel, comprising the steps of:
   calculating an edge function for a first pixel of a patch, the first pixel having a first offset and being in the half-plane;
   calculating a second offset for a second pixel of the patch;
   wherein the second offset is the negative of the first offset, and wherein the second offset is calculated using 2's complement arithmetic by inverting the bits of the first offset; and
   comparing the first offset with the second offset, wherein if the second offset is greater than or equal to the first offset, the second pixel is in the half-plane.

14. The method of claim 13, wherein the position of a third pixel of the patch is stated as an offset from a nearest one of a plurality of reference points.

15. The method of claim 14, wherein at least one of the plurality of reference points is in an adjacent patch.

16. The method of claim 14, wherein a first reference point of the plurality is the first pixel.

17. The method of claim 13, wherein the second offset is the negative of the first offset, and wherein the second offset is calculated using 2's complement arithmetic by inverting the bits of the first offset and adding one.

* * * * *